(12) United States Patent
Bruntz et al.

(10) Patent No.: US 6,373,032 B1
(45) Date of Patent: Apr. 16, 2002

(54) APPARATUS AND METHOD FOR MULTIPLE TEMPERATURE RANGE CONTROL

(75) Inventors: Jordan S. Bruntz, Baxter; Scott E. Griffith, Newton; Michael D. Lafrenz, Newton, all of IA (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 09/329,584

(22) Filed: Jun. 10, 1999

(51) Int. Cl.$^7$ ................................................ H05B 1/02
(52) U.S. Cl. ............................ 219/494; 34/31; 34/48
(58) Field of Search ............................ 219/494, 482, 219/200, 222, 201; 392/347, 360, 380; 34/31, 48, 54, 495, 486, 491, 549, 30, 86, 53

(56) References Cited

U.S. PATENT DOCUMENTS

| | | | |
|---|---|---|---|
| 3,031,768 A | | 5/1962 | Kurowski |
| 3,917,165 A | | 11/1975 | Cross |
| 4,083,118 A | * | 4/1978 | Cotton ........................ 34/562 |
| 4,086,707 A | * | 5/1978 | Bochan ........................ 34/554 |
| 4,151,387 A | * | 4/1979 | Peters, Jr. ................... 219/626 |
| 4,196,343 A | * | 4/1980 | Han ............................ 392/385 |
| 4,226,026 A | | 10/1980 | Deming et al. |
| 4,231,166 A | * | 11/1980 | McMillan .................... 34/553 |
| 4,275,508 A | * | 6/1981 | Jones |
| 4,360,977 A | * | 11/1982 | Frohbieter ...................... 34/86 |
| 4,397,101 A | * | 8/1983 | Rickard ....................... 34/486 |
| 4,531,305 A | * | 7/1985 | Nagayasu et al. ............. 34/445 |
| 4,549,362 A | * | 10/1985 | Haried ........................ 34/395 |
| 4,556,770 A | * | 12/1985 | Tazima et al. ............. 219/627 |
| 4,766,913 A | * | 8/1988 | Klein ......................... 219/222 |
| 5,172,490 A | * | 12/1992 | Tatsumi et al. .............. 34/488 |
| 5,235,159 A | * | 8/1993 | Kornrumpf et al. ........ 219/486 |
| 5,347,727 A | * | 9/1994 | Kim ............................. 34/491 |
| 5,443,541 A | * | 8/1995 | Louis .......................... 34/486 |
| 6,079,121 A | * | 6/2000 | Khadkikar et al. ........... 34/538 |

* cited by examiner

*Primary Examiner*—Tu Ba Hoang
(74) *Attorney, Agent, or Firm*—Zarley McKee Thomte Voorhees & Sease

(57) ABSTRACT

An apparatus and method for infinitely variable adjustment of temperature range of a device in multiple selected temperature ranges. The method includes providing a plurality of operational temperature ranges of the device, selection of a desired temperature range, and infinitely variable selection of a specific temperature within a selected range. The apparatus includes a temperature range mechanism limiting operational temperature to first and second temperature ranges, and a control mechanism to select one of the first and second temperature ranges and then infinitely adjusting temperature within the selected range. In the example of a clothes dryer, the invention allows the selection of a higher or lower temperature range for the clothes dryer and, once the range is selected, infinitely variable temperature control within the selected range.

25 Claims, 2 Drawing Sheets

APPARATUS AND METHOD FOR MULTIPLE TEMPERATURE RANGE CONTROL

BACKGROUND OF THE INVENTION

1. Field of the Invention

This invention relates to temperature control of a system or device that generates heated air, and in particular, to a temperature control that has multiple selectable temperature ranges.

2. Problems in the Art

A variety of devices utilize heated air. One example is a clothes dryer. A conventional drying mode uses internal means to heat air and supplies the heated air to the clothes in the clothes dryer for a pre-selected time period. The amount of heat provided to dry the clothes is primarily a function of the temperature of the heated air and the amount of drying time manually selected by the user. For example, if a relatively small amount of heat is needed, a shorter time period is selected. Increased amounts of heat are achieved by lengthening the time period.

However, the wide variety of available fabric types has resulted in an expansion of desired drying options for clothes dryers. For example, it can be detrimental to some fabrics to be exposed to normal dryer temperatures. It can also be detrimental to some fabrics to be exposed to normal dryer temperatures for extended periods of time, but such fabrics could sustain higher dryer temperatures during shorter periods.

Economic considerations also come into play. As is obvious, a single temperature clothes dryer requires energy to produce the heated air for drying. The single temperature must be selected to accommodate a wide variety of drying tasks. However, some drying tasks can be accomplished effectively at lower temperatures. In those cases a single temperature dryer would provide more heat than needed and consequently consume excessive amounts of energy. Most drying applications require the combination of heated air and tumbling for good results. Similarly, other applications require relatively low temperatures. In these cases, lack of flexible temperature control can result in unneeded consumption of energy. As discussed above, there are also situations where higher temperatures may be needed. Again lack of temperature flexibility may result in un-needed expenditure of energy or time during a drying application.

As a result, attempts have been made to provide for different drying temperatures in clothes dryers. See, for example, U.S. Pat. No. 4,226,026 to Deming et al and U.S. Pat. No. 3,031,768 to Kurouski. While these patents recognize that different temperatures can be advantageous for different fabrics and drying applications, their solutions are to provide multiple fixed levels of heat selectable by the user. Instead of having one dryer temperature, these patents allow selection between several fixed temperature levels.

While such a solution provides more temperature options for a user, there is still room for improvement in the art. It would be advantageous to have more flexibility in the control of heated air temperature for devices utilizing heated air. It is therefore a principal object of the present invention to provide an apparatus and method for multiple temperature range control which improves over or solves the problems and deficiencies in the art.

It is a further object of the present invention to provide an apparatus and method as above described which provides for not only multiple temperature ranges of heated air, but infinitely variable control of the temperature of the heated air within each range.

A further object of the present invention is to provide an apparatus and method as above described which provides more temperature control options for the user.

Another object of the present invention is to provide an apparatus and method as above described which is more economical with regard to energy use.

A still further object of the present invention is to provide an apparatus and method as above described which is efficient, economical, and durable.

These and other objects, features, and advantages of the present invention will become more apparent with reference to the accompanying specification and claims.

SUMMARY OF THE INVENTION

The invention includes an apparatus and method for infinitely variable control of heated air temperature within multiple temperature ranges. The method includes providing a plurality of temperature ranges within normal operating temperatures of a heated air application or device. The user is allowed to select one of the plurality of temperature ranges. The user is additionally allowed infinitely variable control of temperature within the selected range.

The apparatus according to the present invention includes a temperature range mechanism which thermostatically limits the temperature of the heated air to a plurality of temperature ranges. A control mechanism allows a user to select between the temperature ranges and then infinitely variably adjust the temperature within the selected range.

DETAILED DESCRIPTION OF THE PREFERRED EMBODIMENT

Figure 1:
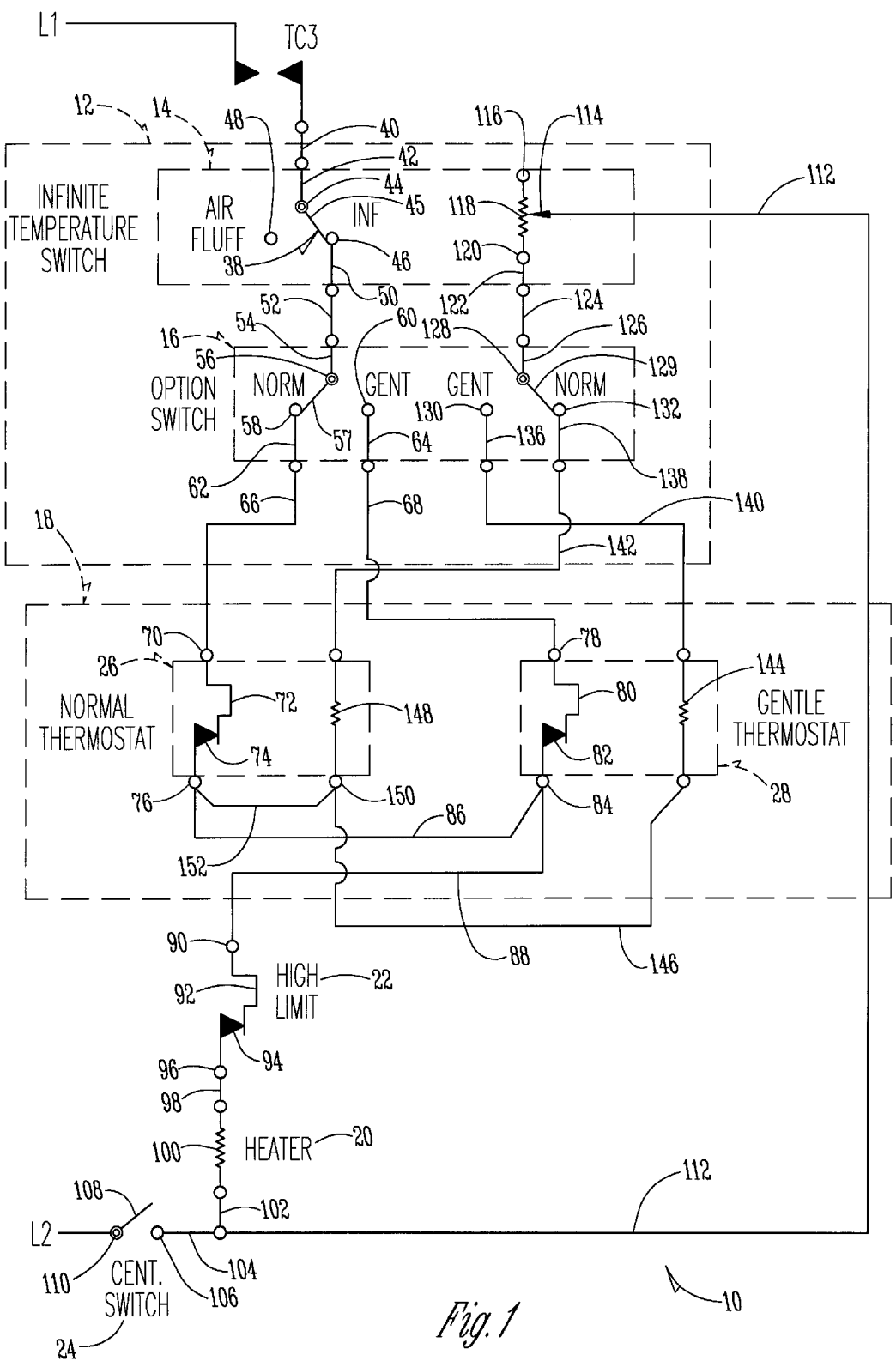
FIG. 1 is an electrical schematic of control circuitry according to a preferred embodiment of the present invention.

To achieve a better understanding of the invention, a preferred embodiment according to the invention will now be described in detail. Frequent reference will be taken to the drawings. Reference numbers and letters will be utilized in the drawings to indicate certain parts and locations in the drawings. The same reference numerals and/or letters will be used to indicate the same parts or locations throughout the drawings, unless otherwise indicated.

FIG. 1 schematically illustrates a control circuit which will be referred to generally by reference numeral 10. Circuit 10 has a first electrical connection L1 to line voltage, and a second connection L2 to line voltage. In the preferred embodiment, control circuit 10 is operatively installed in an electric clothes dryer and line voltage between L1 and L2 is 220 volts.

Circuit 10 comprises two main sections. A control mechanism section 12 includes infinite temperature switch 14 and option switch 16. A temperature range mechanism 18 is the second principle portion of circuit 10.

As shown in FIG. 1, a timer contact TC3, such as well known in the art, controls the actuation of circuit 10. The user manually sets the timer to a desired time period. Circuit 10 is thus connected to line voltage for that period. In this example, an electrical heater 20 is included in circuit 10 between L1 and L2. Heater 20 is such as is conventional and well known within the art, converting a portion of electrical current through circuit 10 into thermal energy when current is passed through heater 20. This thermal energy is utilized to heat the air which is then channeled into the clothes drying chamber of the dryer by conventional methods and apparatus.

As shown in FIG. 1, a high limit thermostatic switch 22 is also installed in circuit 10 between L1 and L2. Switch 22 is used in many clothes dryers and serves as a safe guard back-up or cut-out switch in case dryer temperature for some reason exceeds a safety limit and other thermostatic controls do not prevent such a temperature.

FIG. 1 additionally shows centrifugal switch 24 associated with a drive motor (not shown) for rotating the dryer drum (also not shown), also well known in the art. Switch 24 is closed as long as the drive motor is energized and the dryer drum is rotating. Upon cessation of dryer drum rotation, switch 24 opens and thus prevents heating of the dryer chamber.

Temperature range mechanism 18 includes what are referred to here as "normal" thermostat 26 and "gentle" thermostat 28. Operation of these elements of circuit 10 will be discussed in detail below.

Figure 2:
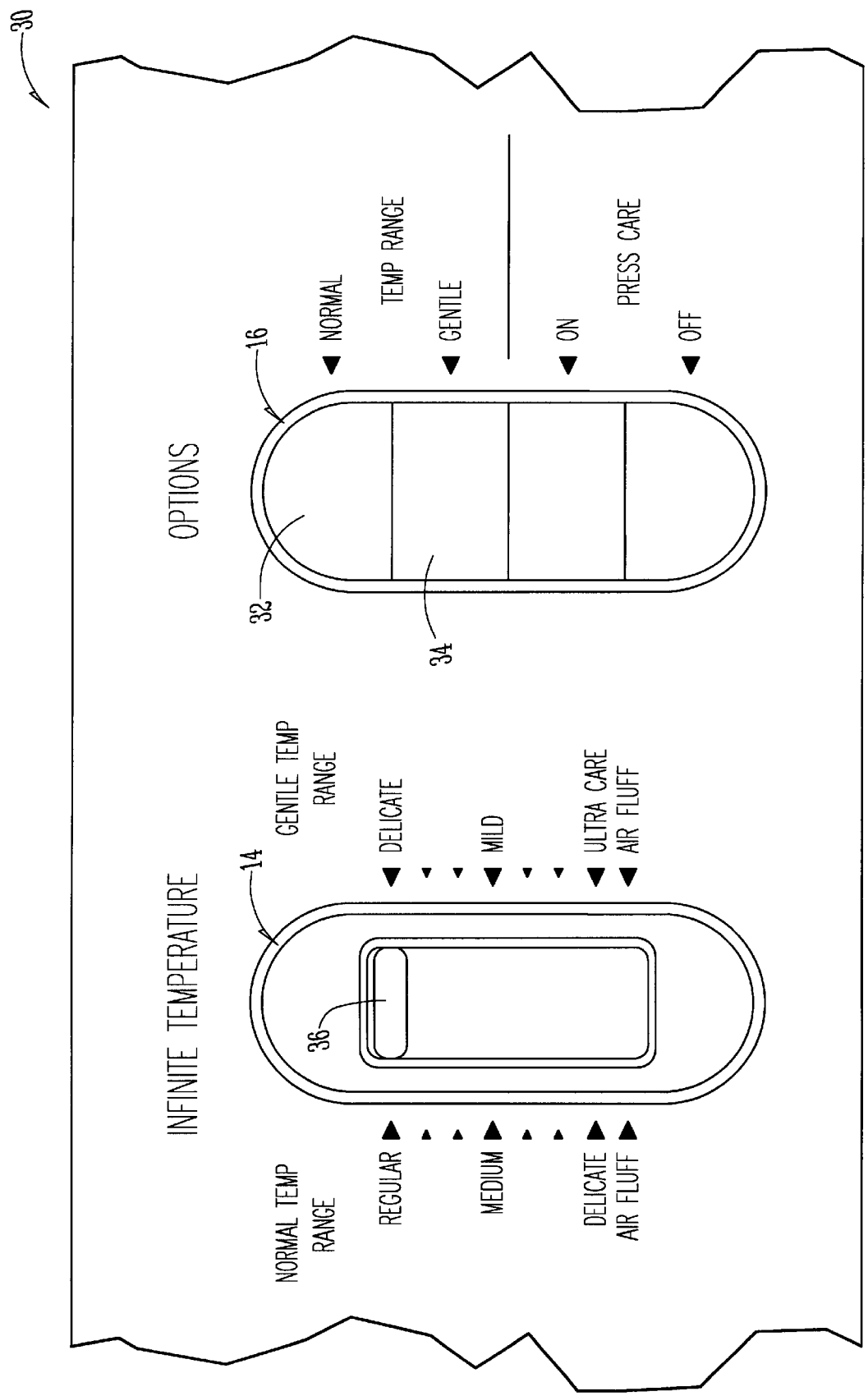
FIG. 2 is a diagrammatic view of mechanical, manually operated control switches according to a preferred embodiment of the present invention.

FIG. 2 illustrates the manual controls on the external control panel or dryer fascia of a dryer 30 that are associated with circuit 10 of FIG. 1. "Options" switch 16 has a manual push button 32 to select a "normal temperature range" for dryer 30 and a manual push button 34 to select a "gentle temperature range" for dryer 30. Buttons 32 and 34 are exclusive of each other. When one is selected, the other one is deselected and vice versa. As can be seen in FIG. 1, this is accomplished by option switch 16 being a double pole, double throw switch. When push button 32 is selected, option switch 16 would be in the position shown in FIG. 1 with conductors 57 and 129 contacting poles 58 and 132 respectively. On the other hand, when push button 34 is selected, option switch 16 in FIG. 1 would be changed so that the current path would flow to the poles 60 and 130 of switch 16 labeled "GENT" instead of "NORM".

Thus, the user manually selects a desired temperature range between normal temperature range and gentle range by pushing button 32 or 34 corresponding to the indicia ("Normal" or "Gentle") on the facia of dryer 30. In the preferred embodiment, a normal temperature range can be 150° Fahrenheit to 140° Fahrenheit. The gentle range, lower than normal range, could be 130° Fahrenheit to 120° Fahrenheit. These ranges can vary according to desire and need. They can be separated or could overlap.

FIG. 2 illustrates that infinite temperature switch 14 includes a manually operated slide control 36. Indicia on the fascia around slide control 36 provides the user with visual information regarding different positions of control 14. If normal temperature range button 32 is selected on switch 16, the indicia on the left side of slide 36 is operative. The user would have infinitely variable selection of the temperature within the normal temperature range (between the high end of the range denoted by the top-most arrow and the label "regular", down to the lowest part of the range denoted by the arrow and labeled "delicate").

If push button 34 of switch 16 is selected, the gentle temperature range (i.e. a lower temperature range) would be in operation. The user would have infinitely variable adjustment of temperature within the gentle temperature range as noted on the right side indicia of slide control 36 in FIG. 2. This would include the upper end of gentle temperature range denoted by the arrow and label "delicate" down to the lowest end of that range denoted by the arrow and label "ultra care".

Switch 14 presents an additional dryer mode of operation. An "air fluff" mode, which would not utilize any heated air, can be invoked at any time during the timed drying operation by moving slide control 36 to the very bottom of its travel in FIG. 2 (into alignment with the arrows and labels "air fluff"). Referring to FIG. 1, this movement of slide control 36 would mechanically move air fluff switch 38 from the position shown in FIG. 1 to its other state toward pole 48. This would cut out heater operation from the circuitry but allow rotation of the dryer drum and continue delivery of air flow through the dryer for the process of air fluffing, such as is well known within the art.

Therefore, as can be seen by referring to FIGS. 1 and 2, the user can select between a higher "normal temperature range" and a lower "gentle temperature range". Once the range is selected, the user then additionally has infinitely variable adjustable control over the temperature within the selected range. For example, if normal temperature range is selected at options switch 16, slide 36 of infinite temperature switch 14 then allows the user to adjust temperature within a range from a high of 150° Fahrenheit to a low of 140° Fahrenheit, or any temperature in between. If the "gentle" temperature range is selected, infinite adjustability between 130° Fahrenheit and 120° Fahrenheit is possible. The user thus has the ability to either save energy by utilizing the least amount of heat energy for the given range, or very minutely tailor temperature within the range for a given fabric or drying strategy. The user is not simply provided with two or three fixed temperatures to select from. Rather a normal dryer operating range is first segmented into multiple temperature ranges. Then, within each of those ranges, the user is provided with infinitely variable temperature adjustablility.

Operation of circuit 10 of FIG. 1 is as follows. The user selects between buttons 32 and 34 for normal or gentle temperature range. This determines the position of conductors 57 and 129 in double-pole, double-throw "options" switch 16 (e.g. 864 Series double pole, double throw switch, ARK-LES Corporation of Boston, Mass.). If the normal temperature range is selected, conductors 57 and 129 would be in the position shown in FIG. 1 contacting poles 58 and 132. If slide 36 (FIG. 2) is in a position other than "air fluff", conductor 45 in air fluff switch 38 (FIG. 1) would be in the position contacting pole 46 as shown in FIG. 1, namely in the "INF" or infinite temperature control state. Once the operator sets timer contact TC3 to a drying time period and the dryer drum begins rotating, conductor 108 of centrifugal switch 24 would close contacting pole 106 and creating a conducting pathway between L1 and L2. Resistive element 100 of heater 20 would then begin to produce heat.

An electrical pathway would then form, beginning at line input L1 and through timer contact TC3, through conductor 40 and to infinite temperature switch 14. The current path would then flow through conductors 42, 45, 50, 52, 54, 57, 62, and 66 to "normal" thermostat 26. Normal thermostat 26 comprises a thermally sensitive switch (e.g. Thermodisc, division of Emerson Electronics, St. Louis, Mo., model number 60T11) between poles 70 and 76. A bi-metal member 72 would have characteristics predetermined to separate from electrical contact 74 upon reaching a given temperature (e.g. 150° Fahrenheit). Normal thermostat 26 also includes an internal biasing resistor 148. The bi-metal member 72 is positioned to react to the temperature of heated air created by heater 20 in dryer 30.

However, current flow through internal biasing resistor 148 would supply additional heat locally to bi-metal member 72 and thus cause a break in current to heater 20 at dryer temperatures lower than 150° Fahrenheit, depending on the amount of additional heat generated by internal biasing resistor 148. The more current through biasing resistor 148, the more heat it generates. The more heat it generates, the more heat is experienced by bi-metal member 72 (in addition to the heat generated by heater 20). This effectively creates an operating range for normal thermostat 26 between a high temperature (e.g. 150° Fahrenheit) and a lower dryer air temperature (e.g. 140° Fahrenheit).

As long as bi-metal member 72 is in electrical communication with contact 74, current would flow from pole 76 through conductor 86 to pole 84, and through conductor 88 to pole 90 of high limit thermostat switch 22. As long as bi-metal member 92 of high limit thermostat 22 is in electrical communication with contact 94 (e.g. up to a limit determined by the characteristics of member 92), current would continue through pole 96, conductor 98, heater resistive element 100, conductor 102, conductor 104, and switch conductor 108.

At the same time, current would flow in a parallel circuit through conductor 112 to a potentiometer including resistive element 118 in infinite temperature switch 14 then through conductors 122, 124, 126, 129, 138, and 142, through internal biasing resistor 148, and through conductor 152 to pole 76 of normal thermostat 26. Slide control 36 would include a mechanical linkage (not shown) to variable connection 114 of the potentiometer. Movement of slide 36 would adjust the amount of resistance in the above described parallel circuit that is in series with internal biasing resistor 148.

As is well known in the art, if slide 36 is positioned at the top of its range of travel (at the "regular" setting for normal temperature range), variable connection 114 would provide the most resistance to internal biasing resistor 148 and thus, conversely, internal biasing resistor 148 would create the least amount of heat energy that would influence bi-metal member 72 of normal thermostat 26. On the other hand, movement of slide 36 to the "delicate" position of the normal temperature range (see FIG. 2) would provide the least electrical resistance through resistance element 118 and thus cause the highest heat output from internal biasing resistor 148, which in turn would create the most influence on bi-metal member 72 of normal thermostat 26.

Thus, in the above-described normal temperature range setting for option switch 16, adjustment of infinite temperature slide 36 of infinite temperature switch 14 would provide infinitely variable control of dryer air temperature within the higher "normal temperature range" for the dryer. Options switch 16 would set the range for drying (150° F. to 140° F.) by selecting the maximum temperature trip point of normal thermostat 26 (150° F). Infinite temperature switch 14 would bias or adjust the trip point of normal thermostat 26 including and between 150° F. to 140° F. by proportionally adding to the amount of heat sensed at bi-metal member 72. This effectively provides a 150° F. to 140° F. range and infinite selection of operating temperature of the dryer within that range. Heater 20 would heat such air to the selected temperature within the "normal range" until temperature exceeded the trip point of bi-metal member 72 of normal thermostat 26, the timer associated with contact TC3 times out, high limit thermostat 22 tripped, or the drive motor discontinued operation and opened centrifugal switch 24.

If the heater 20 heated air beyond the trip point for normal thermostat 26, the circuit would open and heater 20 would be turned off until dryer air temperature fell below the trip temperature. At that point bi-metal member 72 would close and become conducting again. Heater 20 would heat dryer air again. The control circuit would thus keep dryer air at or near the infinitely adjustable selected temperature within the selected temperature range.

At any time, the user could change the trip point of normal thermostat 26 by altering the position of slide control 36, thus changing the resistance value of the potentiometer and consequently the amount of heat generated by internal biasing resistor 148. This would adjust the dryer operating temperature within the normal temperature range.

If the user would like a lower temperature range for a given drying batch, the gentle temperature range (e.g. 120° Fahrenheit to 130° Fahrenheit) would be selected by pushing button 34 of "options" switch 16. This in turn would move switch conductors 57 and 129 to the "GENT" or "gentle" positions of options switch 16 in FIG. 1 (conducting to switch poles 60 and 130 instead of poles 58 and 132). Circuit 10 would operate essentially in the same manner as described above except that the current path from pole 56 of option switch 16 would go to pole 60, through conductors 64, 68, to pole 78 of gentle thermostat 28, through bi-metal member 80 and contact 82 to pole 84 of gentle thermostat 28, and then through conductor 88, high limit thermostat 22, heater 20, and centrifugal switch 24.

Also, current flow from potentiometer (114, 116, 118, 120) would then go from pole 128 of option switch 16 through conductor 129 to pole 130, through conductors 136 and 140, and through internal biasing resistor 144 of gentle thermostat 28, then through conductor 146 to pole 150, through conductor 152 to pole 76, and finally through conductor 86 to pole 84, to place the potentiometer and the internal biasing resistor 144 in parallel with the other circuitry of circuit 10. Bi-metal member 80 of gentle thermostat 28 would function to trip at a lower temperature (e.g. 130° Fahrenheit) than bi-metal member 72 of normal thermostat 26, thus effectively creating a lower or "gentle" temperature range. Internal biasing resistor 144 would function to allow infinitely variable adjustability within the lower temperature range based on resistance selected at potentiometer (114, 116, 118, 120). In the present example, setting slide 36 at "delicate" in FIG. 2 would maximize the amount of resistance of the potentiometer at 118 and thus minimize the amount of influencing heat generated by internal biasing resistor 144, thus effectively causing the 130° Fahrenheit trip temperature of bi-metal member 80 to be the maximum gentle range temperature for dryer air. On the other hand, moving slide 36 to the "ultra care" position would minimize resistance through the potentiometer at 118 and maximize the amount of influencing heat generated by internal biasing resistor 144. This would effectively cause bi-metal member 80 to trip when dryer air was at a temperature lower than 130° (120° Fahrenheit) because of the cumulative effect of heat from the internal biasing resistor 144 with the actual dryer air temperature sensed by gentle thermostat 28. Slide 36 can be placed at any position in between "delicate" and "ultra care" and thus infinitely variably change the resistance of the potentiometer within its range, thus infinitely variably changing the heat generated by internal biasing resister 144 within its range, and thus infinitely variably changing the trip point of gentle thermostat 28 within its range (120°–130° F.).

Therefore, the user not only has a different and lower temperature range available for such things as delicate fabrics, but within that lower range has infinitely variable control of the temperature.

It will be appreciated that the present invention can take many forms and embodiments. The included preferred embodiment is given by way of example only, and not by way of limitation to the invention, which is solely described by the claims herein. Variations obvious to one skilled in the art will be included within the invention defined by the claims.

For example, precise construction and operation of the manual controls for the dual ranges of temperature and the infinitely variable adjustment within a selected range, can vary. They do not have to be push button and slide controls. It is possible for the manual controls to be consolidated into one control.

Furthermore, it is possible for there to be infinitely variable adjustable control in any one of the temperature ranges or in all of the temperatures ranges. It is furthermore possible to have greater than two selectable temperature ranges with infinite variable adjustment of air temperature within any or all of the ranges.

Still further, the temperature ranges can be separate and segregated along the temperature scale or could have some overlap. Temperature ranges can be predesigned by selection of the components and specifications of the thermostats and the potentiometer.

Still further, the above description is made with respect to an electric clothes dryer. The invention is equally applicable to gas dryers. Instead of having the current of circuit 10 control an electric heater 20, heater 20 can be substituted by an electrical component that would operate a gas supply valve. When current flows through the electrical component, the electrical component would open the supply of gas which would be ignited and serve to heat dryer air.

The control system described above is not limited to use with a clothes dryer. By way of example and not limitation, the control system could be utilized for ovens, home or building heating, or water heaters. Other uses are possible.

What is claimed is:

1. A method of controlling heated air temperature of a device comprising:
   providing a plurality of temperature ranges within operating temperatures of said device;
   selecting one of said temperature ranges; and
   adjusting to a specific temperature within said selected range.

2. The method of claim 1 wherein the device comprises a clothes dryer.

3. The method of claim 2 wherein the clothes dryer is gas heated.

4. The method of claim 2 wherein the clothes dryer is electrically heated.

5. The method of claim 1 wherein the plurality of temperature ranges comprises a first temperature range and a second temperature range.

6. The method of claim 5 wherein the first temperature range is lower than the second temperature range.

7. The method of claim 1 wherein the step of providing a plurality of temperature ranges comprises thermostatically limiting each temperature range.

8. The method of claim 1 wherein the step of selecting comprises manually selecting a temperature range.

9. The method of claim 1 wherein the step of adjusting comprises manually adjusting temperature within said selected range in a infinitely variable fashion.

10. An apparatus for infinitely variable temperature control of heated air generated by a device comprising:
    a temperature range mechanism operatively connected to the device for thermostatically limiting the heated air generated by the device to first and second temperature ranges;
    a control mechanism operatively connected to the device allowing a user to select between said first and second temperature ranges and to infinitely variably adjust temperature within said selected range.

11. The apparatus of claim 10 wherein the temperature range mechanism comprises first and second thermostats.

12. The apparatus of claim 11 wherein the first and second thermostats include temperature sensitive switches and internal biasing heaters.

13. The apparatus of claim 10 wherein the control mechanism comprises a manually operable switch.

14. The apparatus of claim 13 wherein the manually operated switch controls selection of the first and second temperature ranges.

15. The apparatus of claim 13 wherein the manually operable switch controls infinitely variable adjustability.

16. The apparatus of claim 15 wherein infinitely variable adjustability is controlled by a potentiometer.

17. An apparatus for infinitely variable temperature control of heated air generated by a device comprising:
    a switch for selecting between first and second circuits;
    the first circuit including a first thermostat with a thermostatically controlled switch and a biasing heater;
    the second circuit including a second thermostat with a thermostatically controlled switch and a biasing heater;
    a potentiometer in series with the biasing heater of the first circuit when the switch selects the first circuit and in series with the biasing heater of the second circuit when the switch selects the second circuit;
    so that the first thermostat defines an upper limit of a first temperature range and the potentiometer allows infinitely variable adjustment downwardly from the upper limit to a lower limit of the first temperature range;
    and the second thermostat defines the upper limit of a second temperature range and the potentiometer allows infinitely variable adjustment downwardly from the upper limit to a lower limit of the second temperature range.

18. The apparatus of claim 17 wherein the device is a clothes dryer.

19. The apparatus of claim 17 wherein the switch is a manually operated control.

20. The apparatus of claim 17 wherein the first circuit includes connections to an electrical power source.

21. The apparatus of claim 17 wherein the devise comprises a clothes dryer including a heater mechanism for generating said heated air.

22. A multiple range temperature control for a clothes dryer comprising:
    a manual control having a first position limiting dryer heat to within a first temperature range;
    and a second position limiting dryer heat to within a second temperature range;
    a manual control infinitely variably adjusting dryer temperature within a selected temperature range.

23. The apparatus of claim 22 further comprising a thermostat to thermostatically limit the first and second temperature ranges.

24. The apparatus of claim 22 further comprising a potentiometer for infinitely variably adjusting dryer temperature within a selected range.

25. An apparatus for temperature control of a device producing heated air comprising:
    an air heating mechanism outputting heated air;
    a thermostatic control operatively connected to the air heating mechanism controlling the temperature of the heated air to fall generally within one of a plurality of selectable temperature ranges and including an infinitely variable adjustment member to selectively adjust temperature of the heated air within a selected temperature range.

* * * * *